United States Patent [19]
Woo

[11] Patent Number: 6,002,545
[45] Date of Patent: Dec. 14, 1999

[54] MINIATURE TAPE LOADING APPARATUS SUITABLE FOR A DIGITAL VIDEO CASSETTE RECORDER

[75] Inventor: Ji-Sung Woo, Seoul, Rep. of Korea

[73] Assignee: Daewoo Electronics Co., Ltd., Rep. of Korea

[21] Appl. No.: 09/045,992

[22] Filed: Mar. 23, 1998

[30] Foreign Application Priority Data

May 6, 1997 [KR] Rep. of Korea ..................... 97-17215

[51] Int. Cl.⁶ ............................................... G11B 5/008
[52] U.S. Cl. ............................................................ 360/95
[58] Field of Search ............................. 360/95, 85

[56] References Cited

U.S. PATENT DOCUMENTS

| | | | |
|---|---|---|---|
| 4,740,850 | 4/1988 | Ogata | 360/85 |
| 5,330,129 | 7/1994 | Inschlag | 360/95 |
| 5,697,568 | 12/1997 | Ishii | 360/95 |

*Primary Examiner*—A. J. Heinz
*Attorney, Agent, or Firm*—Pennie & Edmonds LLP

[57] ABSTRACT

A tape loading apparatus for use in a digital video cassette recorder provided with a deck, a driving unit and a head drum includes a pair of pole base assemblies for loading a tape, each of the pole base assemblies including a pole base having a hole, a pair of guide rails for guiding the pole base assemblies toward the head drum, and a power conveying unit for transmitting a power from the driving unit into the pole base assemblies. The hole of the pole base has such a shape that the pole base assembly fitted around a periphery of the guide rail does not rotate about the periphery of the guide rail.

3 Claims, 5 Drawing Sheets

MINIATURE TAPE LOADING APPARATUS SUITABLE FOR A DIGITAL VIDEO CASSETTE RECORDER

FIELD OF THE INVENTION

The present invention relates to a digital video cassette recorder ("DVCR"); and, more particularly, to a tape loading apparatus for use in the DVCR.

BACKGROUND OF THE INVENTION

In general, a magnetic recording and/or reproducing apparatus having a rotary type head drum such as a DVCR is provided with a tape loading apparatus. The tape loading apparatus is designed to draw a portion of a magnetic tape out of a cassette loaded in the DVCR and to run same in a predetermined path by moving pole base assemblies. The pole base assemblies are respectively provided on guide plates disposed at a supply reel side and a take-up reel side so as to move along a curvilinear loading slot formed at each of the guide plates. While running through the predetermined path, the tape makes contact with a peripheral surface of the head drum, which is provided with at least one or more heads so as to record/reproduce signals onto/from the tape.

One of the prior art tape loading apparatuses for use in a DVCR is shown in FIG. 1. In the illustrated apparatus, the tape loading apparatus includes a motor 11 for loading a tape cassette (not shown) and a tape (not shown), a pair of pole base assemblies 13 for extracting the tape from the loaded tape cassette and bringing it into contact with a head drum 1 of DVCR, and a power conveying unit for transmitting a power from the motor 11 into the pole base assemblies 13.

The pole base assemblies 13 are respectively provided on guide plates 3 disposed at a supply reel side and a take-up reel side so as to move along a loading slot 4 formed at each of the guide plates 3.

The power conveying unit includes a plurality of relay gears 22 driven by the motor 11, a cam gear 24 engaged with one of the relay gears 22 and having a cam groove 26, a relay plate 28 connected with the cam gear 24 by engaging a pin 30 provided at one end thereof with the cam groove 26 and having at the other end thereof a gear portion 32, a pair of pole base assembly loading gears 34. The loading gears 34 are engaged with each other and one thereof is connected with the relay plate 28 by an engagement with the gear portion 32 of the relay plate 28. Further, each of the loading gears 34 is connected with its corresponding pole base assembly 13 via a link device 36.

The tape is loaded first by actuating the motor 11. The power of the motor 11 is transmitted into one of the pole base assembly loading gears 34 via the plurality of relay gears 22, the cam gear 24, and the relay plate 28, which, in turn, rotates the other pole base assembly loading gear 34. The rotation of the pole base assembly loading gears 34 allows the link devices 36 to move the pole base assemblies 13 along its corresponding loading slot 4, till the pole base assemblies 13 reach their respective V-shaped catcher 7 provided at a drum base 5 to thereby bring the tape into contact with the peripheral surface of the head drum 1.

In such a tape loading apparatus, the loading slot is formed with the guide plate, which, in turn, increases the size thereof, resulting in setting a limit to the e:tent that the DVCR can be miniaturized. In addition, the task of assembling and disassembling the link devices is tricky and cumbersome, since the link devices are hidden from view due to the guide plate. Furthermore, since the catcher has the V-shape, it is difficult to catch the pole base assembly effectively and reliably, causing the tape to slacken.

SUMMARY OF THE INVENTION

It is, therefore, a primary object of the invention to provide a tape loading apparatus having no guide plates.

In accordance with one aspect of the present invention, there is provided a tape loading apparatus for use in a digital video cassette recorder provided with a deck, a driving unit and a head drum, comprising: a pair of pole base assemblies for loading a tape, each of the pole base assemblies including a pole base having a hole; a pair of guide rails for guiding the pole base assemblies toward the head drum; and a power conveying unit for transmitting a power from the driving unit into the pole base assemblies, wherein the hole of the pole base has such a shape that the pole base assembly fitted around a periphery of the guide rail is not rotated about the periphery of the guide rail.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

A tape loading apparatus in accordance with a preferred embodiment of the present invention will be described using FIGS. 2 to 7.

Figure 1:
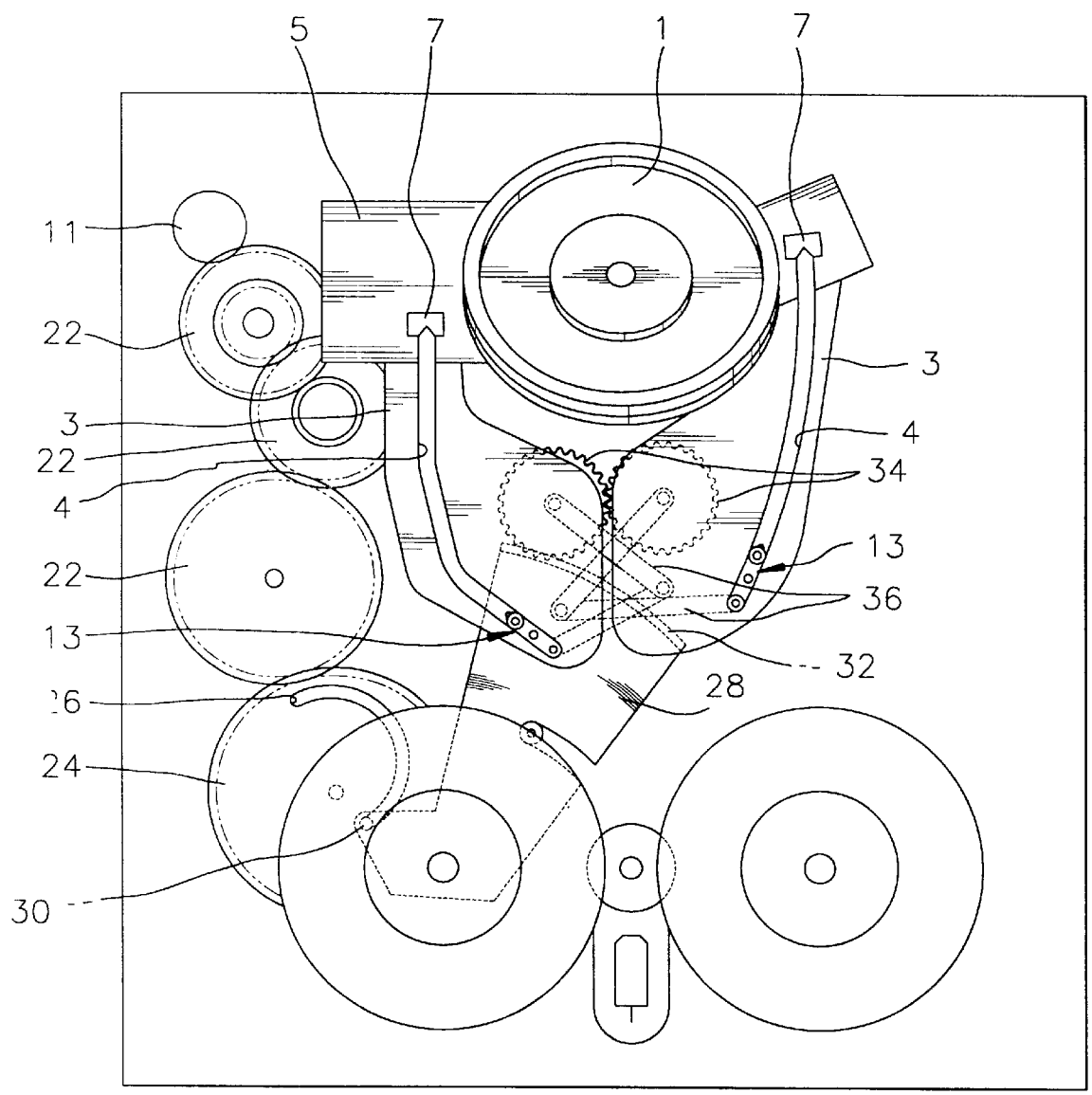
FIG. 1 shows a schematic top view illustrating the conventional tape loading apparatus for use in a digital video cassette recorder.
Figure 2:
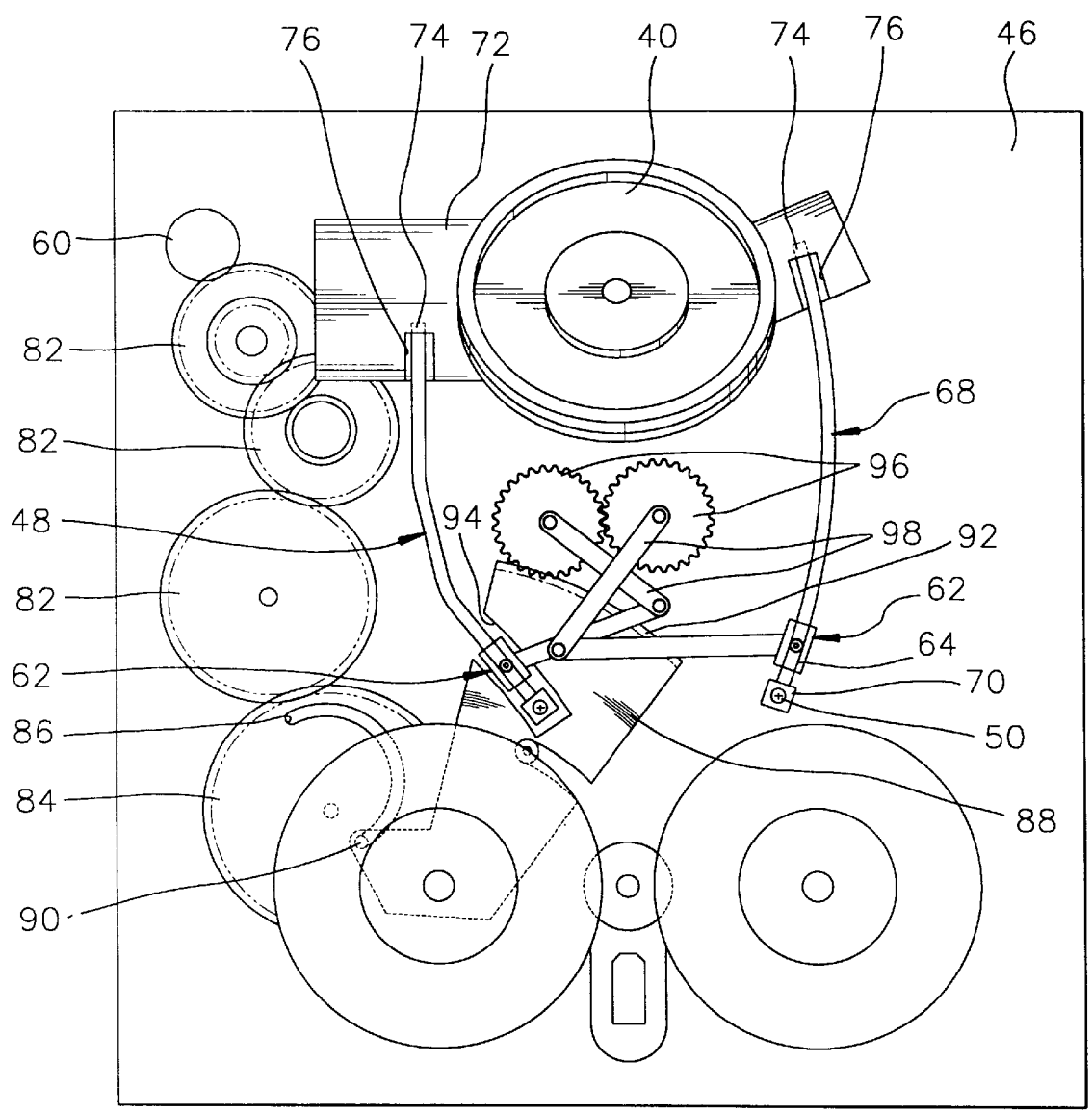
FIG. 2 presents a schematic top view illustrating a tape loading apparatus for use in a digital video cassette recorder in accordance with the present invention.

Referring to FIG. 2, the inventive tape loading apparatus includes a motor 60 for loading a tape cassette (not shown) and a tape (not shown), a pair of pole base assemblies 62 for extracting the tape from the loaded tape cassette and bringing it into contact with a head drum 40 of DVCR, a pair of monorail type guide rails 68 for guiding the pole base assemblies 62, a drum base 72 having a pair of holes 74 and a pair of catchers 76, and a power conveying unit for transmitting a power from the motor 60 onto the pole base assemblies 62.

The pole base assemblies 62 are respectively disposed at a supply reel side and a take-up reel side. Each of the pole base assemblies 62 includes a pole base 64 having a substantially round shape in cross section and a hole 66 (see FIG. 3) at its center. The pole base assembly 62 is slidably engaged with the guide rail 68 by fitting the pole base hole 66 around the guide rail 68.

Figure 3:
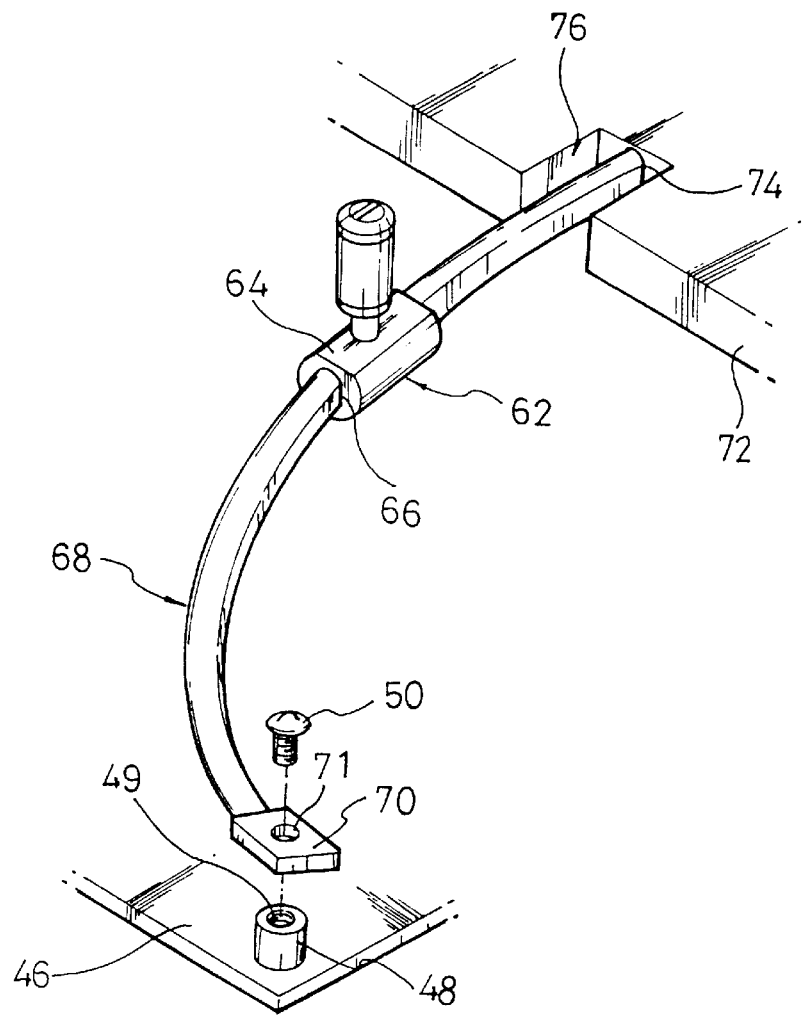
FIG. 3 represents a perspective view setting forth an engagement of a pole base assembly and a guide rail in accordance with the present invention.
Figure 4:
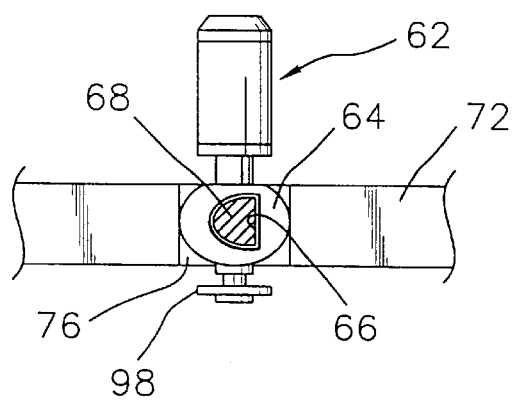
FIG. 4 illustrates a cross sectional view showing an arrangement of the pole base assembly accommodated to a catcher according to the present invention.
Figure 5A:
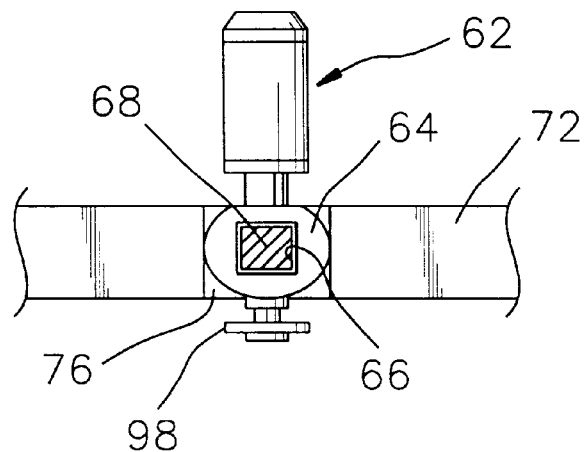
FIGS. 5A and 5B describe various shapes in cross section of a guide rail in accordance with the present invention.
Figure 5B:
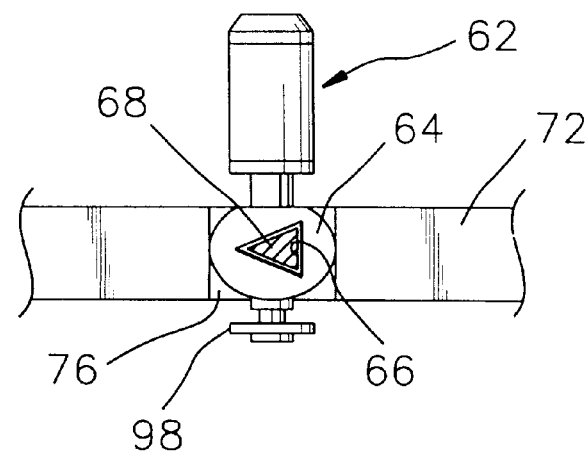

As shown in FIG. 3, the guide rail 68 (only one shown) has at its one end a stopper 70. By inserting one end of the guide rail 68 into the drum base hole 74 and engaging the stopper 70 at the other end thereof with a boss 48 on a deck 46, the guide rail 68 extends from the drum base 72 to the boss 48 so as to guide the pole base assembly 62 toward the head drum 40. The stopper 70 is engaged with the boss 48 by engaging a fastening means, e.g., a screw 50, in and through an inserting hole 71 of the stopper 70 and a threaded hole 49 of the boss 48. As shown in FIG. 4, the guide rail 68 has a substantially semicircle in cross section. Further, as shown in FIGS. 5A and 5B, the guide rail 68 may have various shapes in cross section, e.g., a rectangular, a triangle, as long as the pole base assembly 62 fitted around a periphery of the guide rail 68 is not rotated about the periphery of the guide rail 68. In this case, the pole base hole 66 of the pole base assembly 62 has an identical shape as a peripheral shape of the guide rail 68.

Figure 6:
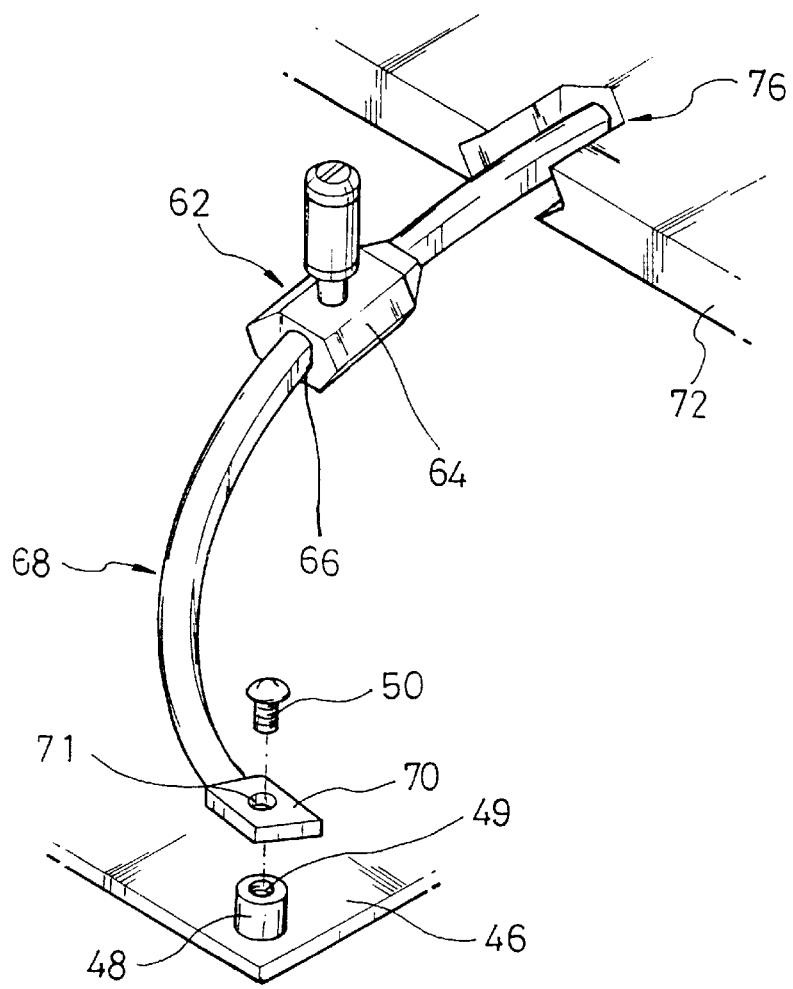
FIG. 6 represents a perspective view setting forth a construction of another pole base assembly in accordance with the present invention.
Figure 7:
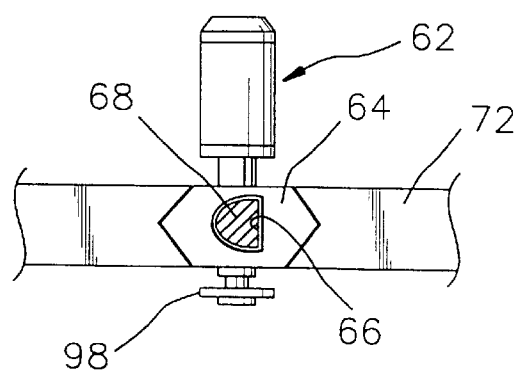
FIG. 7 illustrates a cross sectional view showing an engagement of the pole base assembly in FIG. 6.

Although the above discussions were presented referring to a situation where the pole base 64 has the round shape in cross section, as shown in FIGS. 6 and 7, the pole base 64 may be of a polygonal construction. In this case, it should be noted that the shape of the catcher 76 for accommodating the pole base assembly 62 must be changed depending on the construction of the pole base 64.

Returning to FIG. 2, the power conveying unit includes a plurality of relay gears 82 driven by the motor 60, a cam gear 84 engaged with one of the relay gears 82 and having a cam groove 86, a relay plate 88 connected with the cam gear 84 by engaging a pin 90 provided at one end thereof with the cam groove 86 and having at the other end thereof a gear portion 92, a pair of pole base assembly loading gears 96. The relay plate 88 further has an arcuate opening 94 for providing a setting space to the stopper 70 of the guide rail 68 at the supply reel side. The loading gears 96 are engaged with each other and one thereof is connected with the relay plate 88 by an engagement with the gear portion 92 of the relay plate 88. Further, each of the loading gears 96 is connected with its corresponding pole base assembly 62 via a link device 98. This engagement allows the pole base assemblies 62 to move along its corresponding guide rail 68.

The tape is first loaded by actuating the motor 60. The power of the motor 60 is transmitted into one of the pole base assembly loading gears 96 via the plurality of relay gears 82, the cam gear 84, and the relay plate 88, which, in turn, rotates the other pole base assembly loading gear 96. The rotation of the pole base assembly loading gears 96 permits the link devices 98 to move the pole base assemblies 62 along their respective guide rail 68 till the pole base assemblies 62 reach their corresponding catcher 76 provided at the drum base 72 to thereby bring the tape into contact with the peripheral surface of the head drum 40.

In such a tape loading apparatus, the pole base assemblies are moved along the guide rails, which, in turn, has no guide plates, resulting in making the miniaturization of the DVCR possible. In addition, since the link devices are open from view, the task of assembling and disassembling the link devices to the deck is simple. Furthermore, it is possible to prevent the tape from slackening as a result of the catcher having various shapes.

Although the invention has been shown and described with respect to the preferred embodiments, it will be understood by those skilled in the art that various changes and modifications may be made without departing from the scope of the invention as defined in the following claims.

What is claimed is:

1. A tape loading apparatus for loading a magnetic tape from a tape cassette toward a head drum, comprising:
    a pair of pole base assemblies configured to extract a portion of the magnetic tape from the loaded tape cassette and to bring the extracted portion into contact with the head drum, each of the pole base assemblies including a hole formed therein;
    a pair of guide rails, wherein each pole based assembly is fitted around a periphery of respective one of the guide rails through its hole; and
    a driving source configured to drive the pole base assemblies.

2. The apparatus of claim 1, wherein each hole of the pole base assemblies has a substantially identical shape as a shape of the periphery of the respective guide rail.

3. The apparatus of claim 2, wherein each of the holes of the pole base assemblies has a substantially semicircular cross section.

* * * * *